United States Patent
Sherman (10) Patent No.: US 7,133,381 B2
(45) Date of Patent: Nov. 7, 2006

(54) INTERFERENCE SUPPRESSION METHODS FOR 802.11

(75) Inventor: Matthew J. Sherman, Succasunna, NJ (US)

(73) Assignee: AT&T Corp, New York, NY (US)

( * ) Notice: Subject to any disclaimer, the term of this patent is extended or adjusted under 35 U.S.C. 154(b) by 888 days.

(21) Appl. No.: 10/086,533

(22) Filed: Mar. 4, 2002

(65) Prior Publication Data
US 2002/0184389 A1    Dec. 5, 2002

Related U.S. Application Data

(63) Continuation-in-part of application No. 10/044,916, filed on Jan. 15, 2002, and a continuation-in-part of application No. 10/045,071, filed on Jan. 15, 2002.

(60) Provisional application No. 60/290,789, filed on May 14, 2001, provisional application No. 60/274,259, filed on Mar. 7, 2001, provisional application No. 60/272,854, filed on Mar. 2, 2001.

(51) Int. Cl.
*H04Q 7/00* (2006.01)
*G06F 15/16* (2006.01)

(52) U.S. Cl. .................. 370/329; 370/461; 370/445

(58) Field of Classification Search ............ None
See application file for complete search history.

(56) References Cited

U.S. PATENT DOCUMENTS

| | | | |
|---|---|---|---|
| 4,554,677 A * | 11/1985 | Smith et al. ........... 455/512 |
| 5,042,083 A * | 8/1991 | Ichikawa ............... 455/517 |
| 5,663,954 A | 9/1997 | Hakkanen et al. |
| 5,953,344 A | 9/1999 | Dail et al. |
| 6,373,833 B1 | 4/2002 | Suonvieri et al. |
| 6,895,255 B1 * | 5/2005 | Bridgelall ........... 455/552.1 |
| 2003/0054827 A1 * | 3/2003 | Schmidl et al. ......... 455/450 |
| 2005/0122825 A1 * | 6/2005 | Tzeng ............... 365/230.05 |

* cited by examiner

*Primary Examiner*—Chau Nguyen
*Assistant Examiner*—Rhonda Murphy (57) ABSTRACT

An 802.11 source station transmits a signal with the duration field other than that required for the transmission to prevent transmission by other stations during known sequences. Thus, the source station uses the duration field to spoof the actual time the medium will be occupied, to stations within range of the signal. A station within range of the transmitted signal will check the duration field of the transmitted signal, and update the station's network allocation vector. Thus, the station will not transmit because the station's network allocation vector indicates that the medium is in use, even though the station maybe unable to hear the carrier. Accordingly, spoofed stations may, for example, 1) delay transmission until a more critical transmission has completed, 2) allow unknown or foreign protocol to have preferential use of the medium, 3) prevent interference from hidden stations, and 4) allow sharing of the medium by overlapping basic service sets.

18 Claims, 7 Drawing Sheets

INTERFERENCE SUPPRESSION METHODS FOR 802.11

This application claims the benefit of U.S. Provisional Application No. 60/272,854, filed Mar. 2, 2001, entitled Interference Suppression Methods For 802.11, U.S. Provisional Application No. 60/274,259, filed Mar. 7, 2001, entitled Interference Suppression Methods For 802.11, U.S. Provisional Application No. 60/290,789, filed May 14, 2001, entitled Interference Suppression Methods For 802.11, which are incorporated by reference herein in their entirety.

This application is a continuation-in-part of U.S. application Ser. Nos. 10/044,916 and 10/045,071, entitled Interference Suppression Methods For 802.11, filed on Jan. 15, 2002, and is related to U.S. applications to Interference Suppression Methods For 802.11 which are filed on even date herewith. These applications are co-pending and commonly assigned.

BACKGROUND OF THE INVENTION

Wireless local area networks (WLANs) employ a plurality of mobile network stations, such as data processing devices having wireless communication capabilities. Access to the wireless medium in such a network is controlled in each station by a set media access control (MAC) protocol based on a listen-before-talk scheme.

IEEE 802.11 is a well-established standard for implementing media access control. An enhanced version of the 802.11 standard is the 802.11e standard.

SUMMARY OF THE INVENTION

In development of quality of service enhancements for the existing 802.11 standard, it is desirable to guarantee the time a packet or frame will be delivered on the wireless local area networks. However, when new protocols within new versions such as the enhanced 802.11e standard are introduced, there may be stations on the wireless local area networks that may not understand these new protocols. That is, there may be older stations in the wireless local area network that may not be equipped to practice the enhanced 802.11e standard. Furthermore, not all new stations practice the enhanced 802.11e standard. Accordingly, the older stations or stations not practicing the enhanced 802.11e standard might interfere with the enhanced 802.11e protocols.

Thus, interference may occur that may prevent reception of another desired transmission, or that may cause another transmission to be delayed, so that the delayed transmission is no longer useful once received.

In accordance with the various exemplary embodiments of this invention, while a first source station is transmitting on a medium, transmission from a second source station that is not equipped to practice the enhanced 802.11e standard, or that does not practice the enhanced 802.11e standard, is prevented from starting while the first source station is still using the medium. Thus, in accordance with the various exemplary embodiments of this invention, loss of a packet from being received by a destination station due to the interference from a second source station is prevented.

In accordance with the exemplary embodiments of this invention, using clear channel assessment, the source station desiring to use the medium will not transmit until it determines that the medium is clear, i.e., when it determines that no carrier or significant signal is present. In accordance with the exemplary embodiments of this invention, transmissions earlier in a sequence are provided with information concerning the transmissions later in the sequence, whereby information concerning the later transmissions is used to determine the medium's availability.

In various exemplary embodiments of this invention, an 802.11 duration field may be used to indicate periods of time when no carrier may be present, or a non-802.11 carrier may be present on the medium. For example, a source station may use the duration field to indicate times where if a transmission is begun from the source station, the source station may cause delay in another transmission.

In accordance with various exemplary embodiments of this invention, an 802.11 source station transmits a signal to an address borrowed from another protocol and already in use, to prevent transmission by particular stations during known sequences. In accordance with these exemplary embodiments, the duration field is used to "spoof", or misrepresent the actual time the medium will be occupied, to stations not recognizing the address as a borrowed address.

In accordance with other exemplary embodiments, a specific set of 802.11 stations, rather than all stations within range of the signal, are involved in the spoofing scheme. In accordance with other various exemplary embodiments of this invention, the application of the borrowed address may be further generalized to apply to specific sets of stations. By applying group addressing with a duration field, sets of stations are determined as to whether the stations should obey the duration field set in the signal. Thus, a specific group of stations could be caused to suppress transmission.

In accordance with these various exemplary embodiments of this invention, an 802.11 source station transmits to a borrowed address to indicate the period of time for suppressing transmission from particular stations. That is, in accordance with these exemplary embodiments, the borrowed address is used to misrepresent to particular stations within range of the signal the actual time for setting the network allocation vectors (NAV).

In accordance with other various exemplary embodiments, group addressing is provided that only stations in a particular group are caused to set their suppression mechanism.

In accordance with the various exemplary embodiments of this invention, a station within range of the transmitted signal will check the duration field and the address of the transmitted signal, and set or reset the station's network allocation vector (NAV). Thus, a spoofed station will not transmit because the station's network allocation vector indicates that the medium is in use, even though the station maybe unable to hear the carrier.

In accordance with the various exemplary embodiments of this invention, because their network allocation vectors indicate that the medium is in use, stations within range of the spoofed signal, including hidden stations, will be spoofed into suppression, thereby not interfering with unknown or foreign protocols. That is, in accordance with these embodiments, spoofed stations may, for example, 1) delay transmission until a more critical transmission has completed, 2) allow unknown or foreign protocol to have preferential use of the medium, 3) prevent interference from hidden stations, and 4) allow sharing of the medium by overlapping basic service sets.

DETAILED DESCRIPTION

Figure 1:
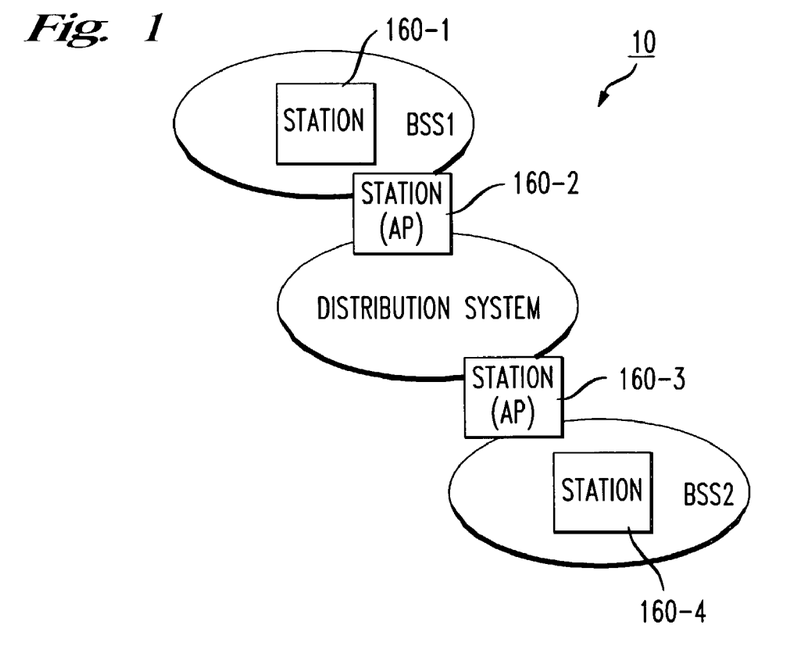
FIG. 1 shows an exemplary embodiment of a wireless local area network.

FIG. 1 discloses an exemplary embodiment of a wireless local area network (WLAN). It should be appreciated that various types of local area networks for forwarding messages to and receiving messages from network stations may be employed in the various exemplary embodiments of this invention.

As shown in FIG. 1, the wireless local area network 10 includes a distribution system 100, stations 160-1 and 160-2 provided in a first basic service set BSS1 having the same basic service, and stations 160-3 and 160-4 provided in a second basic service set BSS2 having the same basic service. For example, stations 160-1 and 160-2 are network stations provided within a cell under a common coordinating function, with one of the stations providing access to the distribution system 100 being an access point (AP) to a basic service set. Similarly, stations 160-3 and 160-4 are network stations provided within a cell under a common coordinating function, with one of the stations providing access to the distribution system 100 being an access point (AP) to a second basic service set. Stations 160-1 to 160-4 together with the distribution system 100 form an extended service set (ESS), where all stations may communicate with each other without involving entities outside of the 802.11 media access control (MAC) architecture. It should be appreciated that any of the stations 160-1 to 160-4 that are not access points may also be mobile network stations.

Further, it should be appreciated that the stations 160-1, 160-2, 160-3 and 160-4 may be connected to other devices and/or networks with which the stations may communicate. Furthermore, though FIG. 1 only shows four stations within the wireless local area network 10, it should be appreciated that a wireless local area network may include more than four stations. That is, it should be appreciated that the basic service sets BSS1 and BSS2 may each include more than two stations in accordance with this invention.

As shown in FIG. 1, stations 160-2 and 160-3 are also access points (AP) that provide access to the distribution system 100 by the basic service sets BSS1 and BSS2, respectively. The distribution system 100 enables mobile network station support to the mobile network stations 160-1 and 160-4 by providing the logical services necessary to handle address to destination mapping and seamless integration of multiple basic service sets. Data moves between the basic service sets BSS1 and BSS2 and the distribution system 100 via access points. In accordance with these exemplary embodiments, because the access points are also stations 160-2 and 160-3, they are addressable entities. It should be appreciated that though FIG. 1 shows basic service sets BSS1 and BSS2 as two separate sets, in accordance with various exemplary embodiment of this invention, the basic service sets may partially overlap, be physically disjointed, or be physically collocated.

As shown in FIG. 1, to send a data message from station 160-1 to station 160-4, for example, the message is sent from station 160-1 to station 160-2, which is the input access point for basic service set BSS1 to the distribution system 100. Station 160-2, as an access point, gives the message to the distribution service of the distribution system 100. The distribution service delivers the message within the distribution system 100 in such a way that the message arrives at the appropriate distribution system destination for the intended station, station 160-4. In the exemplary embodiment of FIG. 1, the message is distributed by the distribution service to station 160-3, which is the output access point for basic service set BSS2, and station 160-3 accesses a wireless medium to send the message to the intended destination, station 160-4.

Figure 2:
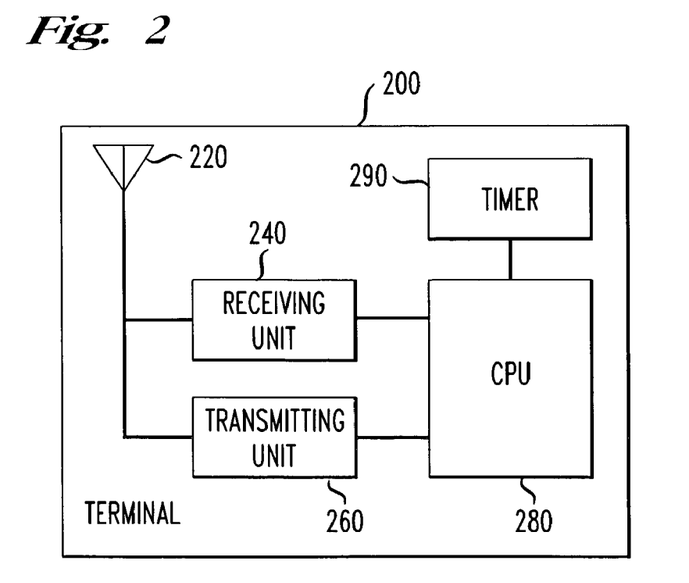
FIG. 2 shows an exemplary embodiment of a station in the wireless local area network.

FIG. 2 discloses an exemplary embodiment of a station in the wireless local area network, such as a mobile network station. As shown in FIG. 2, a station 200 is provided with an antenna 220, a receiving unit 240, a transmitting unit 260, and a central processing unit (CPU) 280. The mobile network station 200 selectively transmits and receives messages.

When receiving data, a signal received by the mobile network station 200 is received by the antenna 220, demodulated into control information or data through the receiving unit 240. Based on the control information addressed at the receiving unit 240, the central processing unit (CPU) 280 controls receipt of data by the receiving unit 240.

In transmitting data, the central processing unit (CPU) 280 identifies whether or not the medium is unused for a time period. If the central processing unit (CPU) 280 determines that the medium is busy, the central processing unit (CPU) 280 proceeds to defer mode, while if the central processing unit (CPU) 280 detects that the medium is unused for an appropriate period of time, the transmitting unit 260 transmits data.

Figure 3:
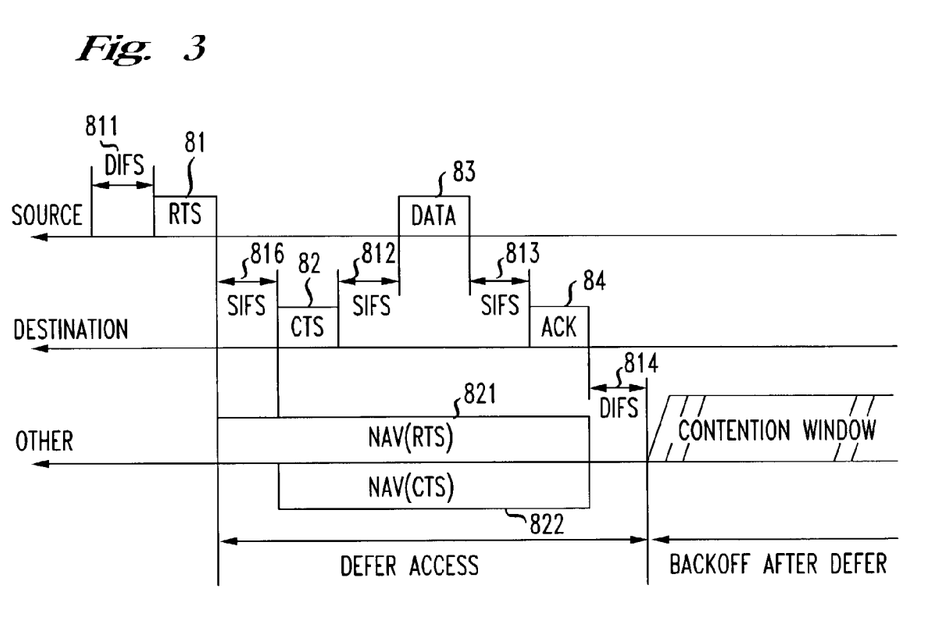
FIG. 3 shows detailed operation of the method to exchange control information when transmitting data from a transmitting station to a receiving station.

FIG. 3 shows detailed operation of the method to exchange control information when transmitting data from a transmitting station to a receiving station, according to an exemplary embodiment of this invention. As shown in FIG. 3, a request-to-send signal (RTS) 81 is used by a transmitting station as control information for identifying the medium connectability to a receiving station. A clear-to-send signal (CTS) 82 is used by the receiving station as control information for responding to the identification made by the request-to-send signal (RTS) 81. Data 83 is sent by the transmitting station after the clear-to-send signal (CTS) 82 has been sent. An acknowledgment signal (Ack) 84 is used by the receiving station as control information for acknowledging the data reception of data 83. Subsequent data is subjected to a succeeding procedure started by another station after confirming termination of the transmission procedure between the transmitting and receiving stations, as acknowledged by the acknowledgment signal (Ack) 84 from the receiving station.

As shown in FIG. 3, time intervals such as inter-frame spaces (IFS) are provided between frames. A station determines that the medium is idle through the use of the virtual carrier detection to determine a medium's availability for transmission for the interval specified. As shown in FIG. 3, the inter-frame spaces (IFS) may include short inter-frame spaces (SIFS), PCF inter-frame spaces (PIFS), and DCF inter-frame spaces (DIFS).

As shown in FIG. 3, short inter-frame spaces (SIFS) are used as gaps between exchange procedures. For example, as shown in FIG. 3, the short inter-frame spaces (SIFS) 816, 812, and 813 are used respectively as gaps between the request-to-send (RTS) frame 81, the clear-to-send (CTS) frame 82, the data frame 83, and the acknowledgment (Ack) frame 84, for example. A short inter-frame space (SIFS) indicates the time from the end of the last symbol of the previous frame to the beginning of the first symbol of the preamble of the subsequent frame as seen at the air interface. The short inter-frame space (SIFS) is the shortest of the inter-frame spaces and is used when stations have seized the medium and need to keep the medium for the duration of the frame exchange sequence to be performed. Using the smallest gap between transmissions within the frame exchange sequence prevents other stations, which are required to wait for the medium to be idle for a longer gap, from attempting to use the medium, thus giving priority to completion of the frame exchange sequence in progress.

As shown in FIG. 3, DCF inter-frame spaces (DIFS) are used by stations operation under the distributed coordination function (DCF) to transmit data frames and management frames. A station using the distributed coordination function (DCF) transmits a data frame if the virtual carrier detection mechanism determines that the medium is idle. As shown in FIG. 3, at a starting point of the exchange procedure from a transmitting station to a receiving station, DCF inter-frame space (DIFS) 811 is spent for confirming connectability (channel occupation status) on the medium for transmission of the request-to-send signal (RTS) 81. Further, as shown in FIG. 3, after data 83 has been delivered, supplemental DCF inter-frame space (DIFS) 814 is spent, and the station performs a backoff procedure.

Figure 4:
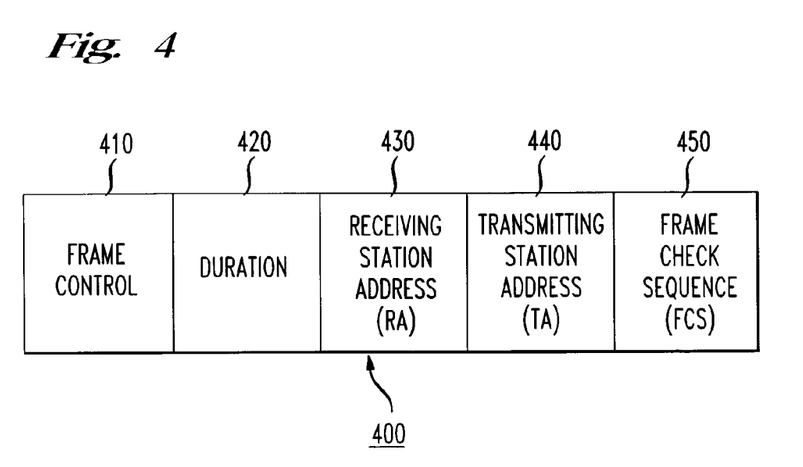
FIG. 4 shows an exemplary embodiment of the request-to-send (RTS) frame format.
Figure 5:
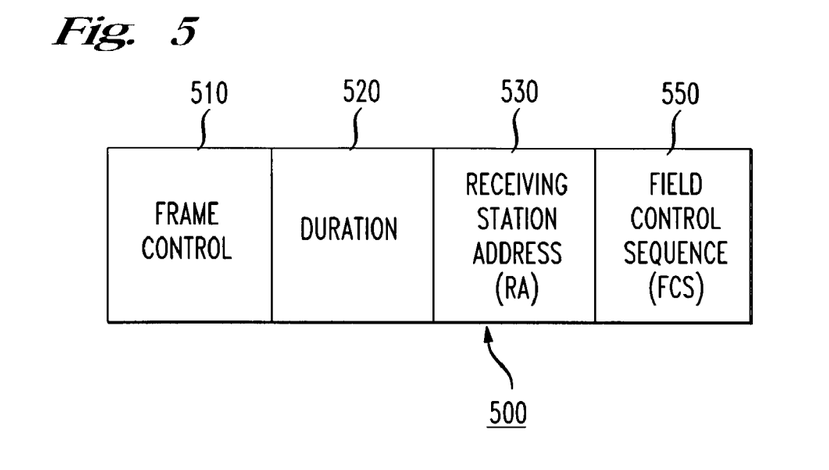
FIG. 5 shows an exemplary embodiment of the clear-to-send (CTS) frame format.

A data frame format comprises a set of fields that occur in a fixed order in all frames. These fields are used to indicate the identification of the basic service set, the address of the source station, the address of the destination station, the address of the transmitting station and the address of the receiving station, for example. FIGS. 4 and 5 show exemplary embodiments of the frame formats according to this invention.

FIG. 4 shows an exemplary embodiment of the request-to-send (RTS) frame format. As shown in FIG. 4, the request-to-send (RTS) frame 400 includes a frame control field 410 for frame control, a duration field 420 for the duration, a receiving station address field 430 for the address of the receiving station, a transmitting station address field 440 for the address of the transmitting station, and a frame check sequence field 450 as a calculation field for a parity check. In the request-to-send frame format of FIG. 4, the receiving station address is the address of the station that is the intended immediate recipient of the pending directed data or management frame. The transmitting station address is the address of the station transmitting the request-to-send (RTS) frame 400.

FIG. 5 shows an exemplary embodiment of the clear-to-send (CTS) frame format. As shown in FIG. 5, the clear-to-send (CTS) frame 500 includes a frame control field 510, a duration field 520, a receiving station address field 530, and a frame check sequence field 550. In the clear-to-send (CTS) frame format of FIG. 5, the receiving station address is the address copied from the transmitting station field 440 of the immediately previous request-to-send (RTS) frame 400 to which the clear-to-send (CTS) frame 500 is a response.

For a station to transmit, using virtual and physical carrier detection, the station determines if another station is transmitting. If no station is determined to be transmitting, the transmission may proceed. The transmitting station ensures that no other station is transmitting for a required duration before attempting to transmit. If another station is determined to be transmitting, the detecting station defers transmission until the end of the current transmission.

The request-to-send (RTS) and the clear-to-send (CTS) frames 400 and 500 are exchanged prior to the actual data frame to distribute medium reservation information to announce the impending use of the medium. In accordance with an exemplary embodiment, the request-to-send (RTS) and the clear-to-send (CTS) frames 400 and 500 contain a duration field that defines the period of time that the medium is to be reserved to transmit the actual data frame and the returning acknowledgment frame. All stations within the reception range of either the originating station which transmits the request-to-send (RTS) signal or the destination station which transmits the clear-to-send (CTS) frame learns of the medium reservation. Thus, a station can be unable to receive from the originating station yet still know about the impending use of the medium to transmit a data frame.

The request-to-send (RTS) and clear-to-send (CTS) signals 81 and 82 contain information to set the network allocation vectors (NAV) for the stations within the range of the signals. In FIG. 3, each network allocation vector (NAV) field 821 in 822 shows the information contained in the request-to-send (RTS) and clear-to-send (CTS) signals 81 and 82, respectively.

The network allocation vector (NAV) maintains a prediction of future traffic on the medium based on duration information that is announced in the request-to-send (RTS) and clear-to-send (CTS) frames 81 and 82 prior to the actual exchange of data.

A station receiving a valid frame updates the station's network allocation vector (NAV) with the information received in the duration field contained in frame. As shown in FIG. 3, stations receiving the request-to-send (RTS) frame 81 set the network allocation vector (NAV) 821 in accordance with the request-to-send (RTS) frame 81, while stations only receiving the clear-to-send (CTS) frame 82 set their network allocation vector (NAV) 822 in accordance with the clear-to-send (CTS) frame 82, resulting in the lower network allocation vector (NAV) as shown in FIG. 3.

At the nominal beginning of each contention free period (CFP), the access point (AP) senses the medium. When the medium is determined to be idle for a period of time, the access point (AP) transmits a beacon frame. After the initial beacon frame, the access point (AP) waits for at least another period of time, and then transmits one of 1) a data frame, 2) a CF-Poll frame with which the access point (AP) requests one of the stations to transfer a data packet, 3) a Data+CF-Poll frame which contains a poll and data for the polled station, or 4) a CF-End frame which indicates the end of the contention free period (CFP).

In the exemplary embodiment in FIG. 3, at a starting point of the exchange procedure from a transmitting station to a receiving station, DCF inter-frame spaces (DIFS) 811 and 814 are spent in the contention period (CP) for confirming connectability (channel occupation status) on the medium for transmission of the request-to-send signal (RTS) 81. In accordance with other various exemplary embodiments of this invention, to confirm connectability on the medium for transmission of the request-to-send signal (RTS) 81, shorter PCF inter-frame spaces (PIFS) may be used instead of the DCF inter-frame spaces (DIFS) 811 and 814 with the request-to-send signal (RTS) transmission. Thus, by using the PCF inter-frame spaces (PIFS), priority access to the medium may be obtained.

Though the shorter PCF inter-frame spaces (PIFS) are not normally used outside of the 802.11 contention free period (CFP) and a request-to-send signal (RTS) is normally only transmitted in the contention period (CP), in these exemplary embodiments, a request-to-send signal (RTS) could be used in the contention free period (CFP) or a PCF inter-frame spaces (PIFS) could be used in the contention period (CP) so as to prevent various stations from transmitting at inappropriate times. In these embodiments, receiving stations would behave in a predictable manner and would be suppressed, potentially reducing the possibility of interference.

Transmission of a frame from station 160-1 to station 160-2 of FIG. 1, for example, may not be heard by another station wishing to use the medium to transmit subsequent data because the another station may be too far away, or there may be intervening obstacles. In addition, transmission of the subsequent data may interfere with the transmission of data 83 if the another station transmitting the subsequent data does not understand the protocol of station 160-1 transmitting data 83. Without enhancements, the another station may start to transmit the subsequent data while the first station, station 160-1, is still using the medium. Accordingly, the receiving station for data 83, station 160-2, for example, may hear both transmitting stations 160-1 and the another station transmitting the subsequent data, and the data 83 being received will be lost due to the transmission of the subsequent data from the second transmitting station.

As discussed above, in accordance with exemplary embodiments of this invention, the request-to-send (RTS) and clear-to-send (CTS) signals 81 and 82 include information which indicates the availability of the medium for the subsequent transmission of the subsequent data. For example, request-to-send (RTS) and clear-to-send (CTS) signals 81 and 82 may include a duration value in the duration field to indicate medium availability. A station within the range of the signal will check the duration field of the signal, and update the station's network allocation vector (NAV) to indicate when the medium is known in advance to be busy. Then, even if no carrier is sensed on the medium, the station will not transmit as it knows the medium is in use, even though it maybe unable to hear the carrier. That is, in these exemplary embodiments of this invention, the 802.11 duration field is used to indicate periods of time when no carrier may be present, or a non-802.11 carrier may be present, and the duration field is used to suppress transmissions from stations so as to avoid interference from the suppressed stations.

Figure 6:
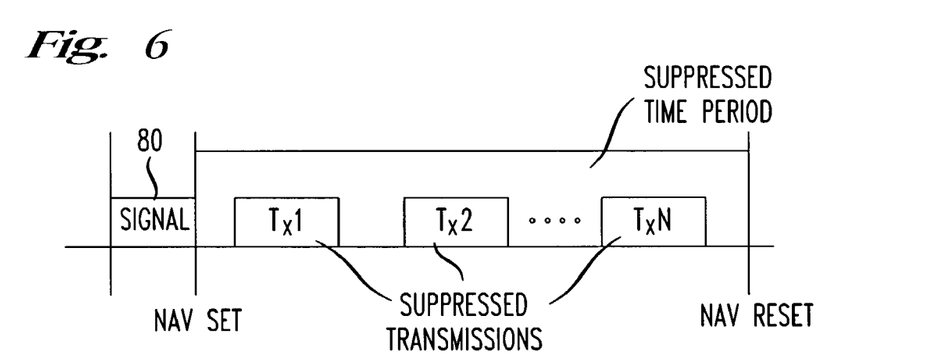
FIG. 6 shows one exemplary method of enhancing the signal transmission according to this invention.

FIG. 6 shows one exemplary method of enhancing the signal transmission according to this invention. In this embodiment, the duration field set to a predetermined value other than the duration time for the subsequent transmissions is sent by a transmitting station, and the stations within the range of the sent signal will update their network allocation vector (NAV) in accordance with the set duration field value.

As shown in FIG. 6, the network allocation vector (NAV) for the stations within the range of the transmitted signal 80, such as a clear-to-send signal (CTS) or request-to-send signal (RTS), is set to be greater than the time required for subsequent transmissions Tx1, Tx2, . . . TxN by the stations within the range. Because the stations within the range and obeying the duration field may believe the duration field represents the time it will take for transmissions immediately following the sequence, the obeying stations are in essence being spoofed by the transmitting station. That is, the duration field is not being used by the transmitting station for its intended purpose of representing the time it will take for transmissions immediately following the sequence. Rather, the duration field is used by the transmitting station to indicate times to suppress the transmissions Tx1, Tx2, . . . TxN by the stations within the range of the signal 80, where if the suppressed transmissions Tx1, Tx2, . . . TxN have begun, another more critical transmission may be delayed, a protocol other than 802.11 which might be undetectable to the 802.11 station may interfere with the 802.11 station, or the transmitting 802.11 stations may interfere with a foreign protocol or advanced 802.11 protocol. Thus, in FIG. 6, during the suppressed time period set by the network allocation vector (NAV), transmissions, Tx1, Tx2. . . TxN from the stations obeying the duration field are suppressed. By spoofing to the stations obeying the duration field, it is possible to get the obeying stations to exhibit behavior for which it was not originally programmed, such as delaying the transmissions Tx1, Tx2, . . . TxN until a more critical transmission has completed or suppressing transmission so that undetectable protocols may not interfere.

In the network of FIG. 1, if station 160-2 wishes to prevent another station from causing a beacon from being transmitted beyond the target beacon transmit time (TBTT), for example, station 160-2 may send a signal to another station such as station 160-1 containing a duration time that exceeds the normal requirements of the protocol so as to cover any time remaining between the current time, and the next target beacon transmit time. Station 160-1 and other stations within range of the sent signal will not realize that the duration field is incorrectly set, and might even propagate the signal further by re-transmitting the duration field. Thus, in this example, station 160-2 would send a signal, such as a request-to-send signal (RTS), to station 160-1 with the duration field set to cover the remaining time to the target beacon transmit time, and the receiving station 160-1 would respond with a clear-to-send signal (CTS) whose duration would be set to cover the remaining time to the target beacon transmit time as well. All stations within range of the request-to-send signal (RTS), clear-to-send signal (CTS), or both would set their network allocation vectors (NAV) so as not to attempt transmission again until after the target beacon transmit time.

In accordance with other exemplary embodiments of this invention, the application of the duration field may be further generalized to apply to specific sets of stations rather than all stations within range. That is, in accordance with these exemplary embodiments, only specific sets of stations are spoofed by the duration field. For example, enhanced stations under the 802.11e or later standard could apply group addressing with the duration field to determine which sets of stations should obey the duration field, and which should ignore it. Thus, a specific group of stations, such as legacy stations which do not apply the enhanced 802.11e standard, could be caused to suppress transmission. That is, because stations applying the enhanced 802.11e standards may already contain protocols that prevent them from transmitting at a suppressed time and the legacy stations which do not apply the enhanced 802.11e standards do not contain these protocols, these legacy stations may be treated as a special group. In this case, the transmitting station sends the signal only to the group of legacy stations.

A transmitting station wishing to block usage of the medium by a set of stations sets the duration field for the length of time during which usage of the medium is to be restricted. Other parameters in the transmission determine which specific group of stations should recognize the value of the duration field. Stations not in this specific group would ignore the value of the duration field. Thus, in the example of FIG. 6, if the transmitting station wishes to block usage of the medium by a group of legacy stations, suppressed transmissions T×1, T×2. . . T×N within the time period set by the network allocation vector (NAV) would only be transmissions from legacy stations.

In an exemplary embodiment, a transmitting station such as an access port (AP) may send a signal, such as the clear-to-send signal (CTS), to a group address. In group addressing, the station transmitting to the group address has access to lists of assigned group addresses and the properties for membership in each of these addresses. A station within range of the clear-to-send (CTS) signal may identify if the receiving station address (RA) of the sent signal is a group address and whether or not the station belongs to that group. A specific set of stations, such as the stations applying an enhanced 802.11e standard, would ignore the duration field of the clear-to-send signal (CTS) if the receiving station address (RA) in a clear-to-send signal (CTS) were set to the group address. The specific set of stations would then surmise that the transmitting station was spoofing the stations that are not applying the enhanced 802.11 standards, such as legacy stations. The stations applying the enhanced 802.11 standards would ignore the duration field in the clear-to-send signal clear-to-send (CTS), and still would be free to transmit. Since stations applying the enhanced 802.11 standards in accordance with this invention know not to delay the beacon from the transmitting access port (AP), the stations applying the enhanced 802.11 standards are free to use the medium. On the other hand, legacy stations and other stations which do not apply the enhanced 802.11 standards would not detect that they are being spoofed, and would set their network allocation vectors for the duration value in the clear-to-send signal (CTS) so as not to transmit. Thus, the spoofed stations are prevented from transmitting at the target beacon transmit time and delaying the beacon from the transmitting access point (AP).

In various exemplary embodiments, a station applying the 802.11 standard may borrow an address already in use for a similar purpose by a related standard, such as the purpose of pausing transmission in the related standard. For example, an 802.11 frame may borrow a multicast address for pausing transmissions from the 802.3 standard to suppress transmissions from particular stations in the 802.11 standard. That is, though the transmissions are in the 802.11 standard, an address from another standard such as the 802.3 standard may be borrowed in the 802.11 transmission. In an exemplary embodiment, the PAUSE address given as 01-80-C2-00-00-01 in Hexadecimal notation may be borrowed from the 802.3 standard.

In these exemplary embodiments, upon receipt of the 802.11 frame containing the borrowed 802.3 multicast address, a station not practicing the enhanced 802.11e standard, such as a legacy station, may assume that the legacy station is addressed by the multicast address, may set the network allocation vector (NAV) of the legacy station in accordance with the duration value in the 802.11 frame, and will not transmit.

On the other hand, a station practicing the enhanced 802.11e standard recognizes that the address of the 802.11 frame is a borrowed multicast address, and will check to ascertain that the enhanced 802.11e station is not in the addressed group, and thus, not set the network allocation vector (NAV). Thus, unlike the pausing effect in the 802.3 standard, the borrowed 802.3 multicast address is used in the 802.11 standard to signal to stations, such as the enhanced 802.11e stations, that the enhanced 802.11e stations need not suppress transmission. By reusing a multicast address, advantages such as saving address space may be obtained.

Table 1 shows an exemplary embodiment of the effects of a clear-to-send (CTS) signal on stations within range of the signal. It should be appreciated that since a legacy station (LSTA) will always set its network allocation vector (NAV) according to the received signal, effects on legacy stations are not shown in Table 1.

TABLE 1

| Message | RA | Effect |
|---|---|---|
| CTS | STA | Set NAV |
| CTS | group | Set NAV if not in Group |
| CTS | broadcast | Set if legacy station |

As shown in Table 1, when a clear-to-send (CTS) signal is transmitted, if a station (STA) identifies that the receiving station address (RA) in the clear-to-send (CTS) signal is the station's own address, that is, a unicast address, the station will set the station's network allocation vector (NAV) in accordance with the received clear-to-send (CTS) signal. If the station identifies that the receiving station address (RA) of the clear-to-send (CTS) signal is that of a group address, that is, a multicast address, the station will set the network allocation vector (NAV) if the station is not in the addressed group. Alternatively, the protocol may be defined such the station sets its network allocation vector (NAV) if the station is a member of the multicast address. If the receiving station address (RA) of the clear-to-send (CTS) signal is a broadcast address, the station will set it network allocation vector (NAV) only if it is a legacy station that does not practice the enhanced 802.11e standard.

It should be appreciated that, while a station transmitting a clear-to-send signal (CTS) may usually expect signals sent in response, in accordance with the various exemplary embodiments of this invention, the clear-to-send signal (CTS) is merely sent for setting the network allocation vector (NAV), and thus, no other responses are expected by the station transmitting a clear-to-send signal (CTS). It should be appreciated that similar provisions with, for example, 802.11 data or null frame, that is a data frame containing no data, may be applied in accordance to this invention.

In accordance with other exemplary embodiments of this invention, a requirement for resetting network allocation vectors when a clear-to-send (CTS) signal is not detected after a request-to-send (RTS) signal, or when no frame is detected within a predetermined time period of a request-to-send (RTS) signal, is added. In an example, if some of the stations in a basic service set (BSS) are legacy stations which require resetting the network allocation vectors when a clear-to-send (CTS) signal is not detected, an additional message may be sent to the broadcast address. This additional clear-to-send (CTS) signal or any other similarly encoded frame may be transmitted immediately after the clear-to-send (CTS) signal response to the request-to-send (RTS) signal, or otherwise may immediately follow the request-to-send (RTS) signal. A station not hindered by this requirement, such as stations practicing enhanced 802.11e standards, may not be affected by the additional clear-to-send signal (CTS), since the additional clear-to-send (CTS) signal contains a duration value corresponding to the same network time for resetting of the network allocation vector (NAV) as the prior request-to-send (RTS) and clear-to-send (CTS) signals. The stations receiving the clear-to-send (CTS) signal may defer resetting their network allocation vectors until the desired duration had expired.

It should be appreciated that this invention is not limited to the clear-to-send (CTS) signal, and that other message types such as a null, acknowledgement signal or data frames could be used to perform the same function as the clear-to-send (CTS) signal.

Table 2 shows an exemplary embodiment of the effects of a request-to-send (RTS) signal on stations within range of the signal. It should be appreciated that other similar encodings may be developed by those skilled in the art using the principles disclosed in this invention. As in Table 1, since a legacy station will always set its network allocation vector (NAV) according to the received signal, effects on legacy station are not shown in Table 2.

TABLE 2

| Message | TA | RA | Effect |
|---------|-----|-----|--------|
| RTS | unicast1 | unicast1 | Set NAV if not in same BSS |
| RTS | unicast1 | unicast2 | Set NAV, Respond CTS, Obey NAV for CTS |
| RTS | unicast1 | multicast1 | Set NAV if not in Group |
| RTS | unicast1 | broadcast | Set NAV |
| RTS | multicast1 | unicast1 | Set NAV if not in Group, send CTS to Group, ignore NAV for CTS, obey physical CCA |
| RTS | multicast1 | multicast1 | Set NAV if not in Group, send CTS to Group, ignore NAV for CTS, obey physical CCA |
| RTS | multicast1 | multicast2 | Set NAV if not in Group, send CTS to Group 1, ignore NAV for CTS, obey physical CCA |
| RTS | multicast1 | broadcast | Set NAV |
| RTS | broadcast | unicast1 | Set NAV if not in same BSS |
| RTS | broadcast | multicast1 | Set NAV if not in same Group |
| RTS | broadcast | broadcast | Set NAV |

As shown in Table 2, when a request-to-send (RTS) signal is transmitted, a station identifies the transmitting station address (TA) and the receiving station address (RA) in the request-to-send (RTS) signal, and sets the station's network allocation vector (NAV) accordingly. As shown in Table 2, if the transmitting station address (TA) is of a first unicast address (unicast1), the station will set its network allocation vector (NAV) if 1) the receiving station address (RA) is a broadcast address, 2) the receiving station address (RA) is also of the first unicast address (unicast1) and the station is in the same basic service set as the first unicast address (unicast1), or 3) if the receiving station address (RA) is a multicast address (multicast1) and the station is not in the same group as the addressed group. Further, if the receiving station address is another unicast address (unicast2), the station will set its network allocation vector (NAV) accordingly, respond with a clear-to-send (CTS) signal if the station's address is the another unicast address (unicast2), and obey the network allocation vector (NAV) in the clear-to-send (CTS) signal.

As shown in Table 2, if the transmitting station address (TA) is of a first multicast address (multicast1), the station will set its network allocation vector (NAV) if the receiving station address (RA) is a broadcast address. Further, if the receiving station address (RA) is also of the first multicast address (multicast1) or another multicast address (multicast2), or a unicast address (unicast1), the station will set its network allocation vector (NAV) accordingly if the station is not in the addressed group of the first multicast address (multicast1), respond with a clear-to-send (CTS) signal if addressed by the receiving station address (RA), ignore the network allocation vector (NAV) for transmitting the clear-to-send (CTS) signal, but obey physical clear channel assessment (CCA). It should be appreciated that it is also possible to encode the message such that the network allocation vector (NAV) is set if the station is in the addressed group of the first multicast (multicast1).

Further, as shown in Table 2, if the transmitting station address (TA) is of a broadcast address (Broadcast), the station will set its network allocation vector (NAV) if 1) the receiving station address (RA) is a broadcast address, 2) the receiving station address (RA) is also of the first unicast address (unicast1) and the station is in the same basic service set as the first unicast address (unicast1), or 3) if the receiving station address (RA) is a multicast address (multicast1) and the station is not in the same group as the addressed group.

Figure 7:
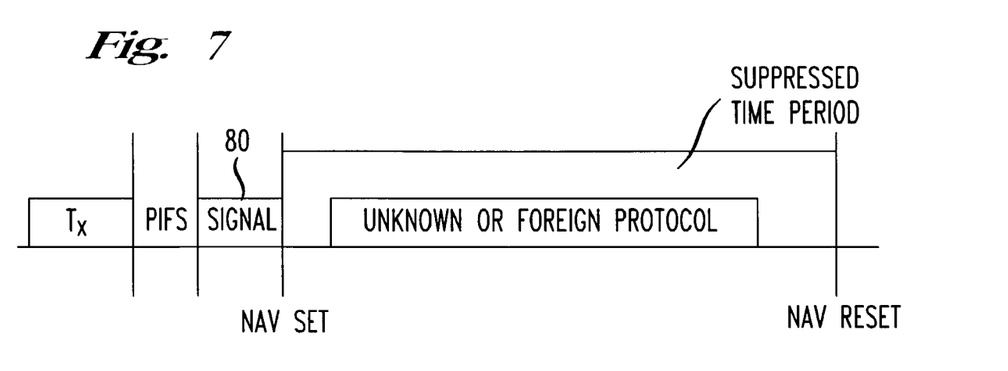
FIG. 7 shows another exemplary method of enhancing the signal transmission according to this invention.

It should be appreciated that the use of the techniques of this invention could be for sharing with a non-802.11 protocol. If the medium is to be reserved for a period of time for use by a non-802.11 protocol, the transmitting station could send a message with the duration field set so as to prevent use of the medium by 802.11 stations when another protocol is active. For example, as shown in FIG. 7, a station practicing the enhanced 802.11e standards could send a signal 80, such as a clear-to-send signal (CTS), to itself with a duration field set to a specified duration value. All stations including stations practicing the enhanced 802.11e standards would set their network allocation vectors (NAV) accordingly. The other unknown or foreign protocol would then have preferential use of the medium during that specified duration value interval. The stations practicing the 802.11 standards within the range of the clear-to-send signal (CTS) would set their network allocation vectors so as not to use the medium, even thought they might not be able to detect the other protocol.

It should be appreciated that, in accordance with this invention, a station practicing an 802.11e standard or some future enhanced 802.11 version may introduce a new protocol within the standard. For example, a token passing scheme may be introduced within the 802.11e enhanced standard, or an unscheduled contention free period (CFP) may be introduced between a transmitting station, such as the access point (AP), and a subset of stations. In accordance with various exemplary embodiments of this invention, the new protocol is specific to a group of stations, and stations that are not in the specific group are set to suppress transmissions. In these exemplary embodiments, the transmitting station may send a request-to-send signal (RTS) from itself, for example, to the group's multicast address in which the duration time would be set for a specific extended period of time. Stations not in the group are set to suppress transmissions, while the transmitting station implements a protocol of its choosing.

In other exemplary embodiments of this invention, an 802.11 CF-End message may be used to indicate the end of the period of time for suppressing transmission other than the time indicated by the duration value. That is, though the CF-End message is normally only used in the 802.11 standards to indicate the end of the contention free period (CFP), in accordance with these embodiments, the CF-End message may be used for other purposes. For example, a source station may use the CF-End message to indicate times where if a transmission from the source station has ended and no further delay of other transmissions is required, the source station may cause transmissions from all stations that had suppressed their transmissions to resume transmitting by resetting a suppression mechanism.

In accordance with the various exemplary embodiments of this invention, the 802.11 source station transmits a CF-End message at times other than the times indicating expiration of the contention free period (CFP), to prevent transmission by other stations during known sequences. That is, in accordance with these exemplary embodiments, the CF-End message is also used to spoof stations within range of the signal by lying about the ending of the contention free period (CFP). A station within range of the CF-End signal will update the station's network allocation vector (NAV) to indicated the reset time of the network allocation vector (NAV).

Thus, if a transmitting station decides that it no longer needs the additional time set aside by the duration field in the request-to-send signal (RTS), for example, the transmitting station may send a CF-End to the broadcast address. The CF-End would cause all stations within the range of the CF-End signal to reset the stations' network allocation vectors so as to shorten the time set aside from that originally specified in the duration field. Similarly, if the previous transmission has ended but the network allocation vector (NAV) has not indicated the end of the suppression duration, as set by the CF-End signal, the station will not transmit because the station's network allocation vector indicates that the medium is still in use.

It should be appreciated that the application of the enhanced CF-End also can be extended to group addressing so that only stations in a particular group are caused to reset their suppression mechanism.

Table 3 shows an exemplary embodiment of the effects of a CF-End signal on stations within range of the signal. As in Table 1 and Table 2, since a legacy station will always set its network allocation vector (NAV) according to the received signal, effects on legacy station are not shown in Table 3.

TABLE 3

| Message | TA | RA | Effect |
| --- | --- | --- | --- |
| CF-End | unicast1 | unicast1 | Reset NAV if in same BSS |
| CF-End | unicast1 | unicast2 | Reset NAV if unicast2 |
| CF-End | unicast1 | multicast1 | Reset NAV if in Group |
| CF-End | unicast1 | broadcast | Reset NAV |
| CF-End | multicast1 | unicast1 | Reset NAV if in Group |
| CF-End | multicast1 | multicast1 | Reset NAV if in Group |
| CF-End | multicast1 | multicast2 | Reset NAV if in Group2 |
| CF-End | multicast1 | broadcast | Reset NAV |
| CF-End | broadcast | unicast1 | Reset NAV if not in same BSS |
| CF-End | broadcast | multicast1 | Reset NAV if not in same Group |
| CF-End | broadcast | broadcast | Reset NAV |

As shown in Table 3, when a CF-End signal is transmitted, a station identifies the transmitting station address (TA) and the receiving station address (RA) in the CF-End signal, and sets the station's network allocation vector (NAV) accordingly. As shown in Table 3, if the transmitting station address (TA) is of a first unicast address (unicast1), the station resets its network allocation vector (NAV) if 1) the receiving station address (RA) is a broadcast address, 2) the receiving station address (RA) is also of the first unicast address (unicast1) and the station is in the same basic service set as the first unicast address (unicast1), or 3) if the receiving station address (RA) is a multicast address (multicast1) and the station is in the same group as the addressed group. Further, if the receiving station address is another unicast address (unicast2), the station resets its network allocation vector (NAV) accordingly if the address of the station is the second unicast address (unicast2).

As shown in Table 3, if the transmitting station address (TA) is of a first multicast address (multicast1), the station resets its network allocation vector (NAV) if 1) the receiving station address (RA) is a broadcast address, 2) the receiving station address (RA) is also of the first unicast address (unicast1) and the station is in the same group as the addressed group, or 3) if the receiving station address (RA) is also the first multicast address (multicast1) and the station is in the same group as the addressed group. Further, if the receiving station address is another multicast address (multicast2), the station resets its network allocation vector (NAV) accordingly if the station is in the second group.

As shown in Table 3, if the transmitting station address (TA) is of a broadcast address (Broadcast), the station resets its network allocation vector (NAV) if 1) the receiving station address (RA) is a broadcast address, 2) the receiving station address (RA) is also of the first unicast address (unicast1) and the station is not in the same basic service set as the first unicast address (unicast1), or 3) if the receiving station address (RA) is a multicast address (multicast1) and the station is not in the same group as the addressed group.

It should be appreciated that the methods of this invention may be applied in overlap mitigation of basic service sets (BSS). That is, the methods may be applied when two or more 802.11 basic service sets (BSS) operate in the same area. In such cases, in accordance to various exemplary embodiments of this invention, the transmitting stations treat each other as foreign protocols, and suppress transmissions within their own basic service sets (BSS) at scheduled times as discussed above. Thus, in the example shown in FIG. 6, the suppressed transmissions T×1, T×2, . . . T×N are thus transmissions within each basic service set (BSS). In these embodiments, the basic service sets (BSS) may take turns sharing the medium.

In an exemplary embodiment, the station groups are defined as all stations existing in a basic service set that interfere with other basic service sets. In this exemplary embodiment, group addresses are assigned corresponding to each of the groups. When a first basic service set and a second basic service set of a plurality of basic service sets arrange a time such that the first basic service set is to suppress interfering transmissions, the transmitting station for the first basic service set may issue a signal such as a clear-to-send (CTS) signal to the group defined as interfering with the second basic service set. Thus, the impact to the first basic service set is minimized, as only stations interfering with the second basic service set are suppressed.

It should be appreciated that the network allocation vector (NAV) for a given station may continually be set, due to suppression for the Contention Free Period (CFP) from several surrounding basic service sets (BSS). Accordingly, the continually set station may never have the chance to transmit.

In accordance with other various exemplary embodiments of this invention, a suppressed station may send a signal, such as a clear-to-send (CTS) signal, in response to a request-to-send (RTS) signal from the access point (AP) of the suppressed station's own basic service set (BSS), to the stations addressed from one of the groups suppressing it. That is, the suppressed station would send a clear-to-send signal (CTS) to the group indicated by the transmitting station, ignoring the suppressed station's own network allocation vector (NAV). The suppressed station would first wait for the medium to be physically clear of any messages using physical carrier sense on the medium. When the access point (AP) from the suppressed station's own basic service set (BSS) hears the clear-to-send (CTS) signal from the suppressed station, the access point (AP) would then know that one set of interfering stations were suppressed. The access point (AP) then sends a CF-End message from itself, to the suppressed station. This would clear the suppressed station's network allocation vector (NAV), and allow the cleared station to transmit for some period of time. The transmitting station may repeat this process with several groups of interfering stations in a row if necessary until the cleared stations could transmit in a clear medium.

In essence, in accordance with the various exemplary embodiments of the present invention, the use of signals such as the request-to-send signal (RTS), the clear-to-send signal (CTS), and CF-End would create an unscheduled contention free period (CFP), that could be used to implement the normal contention free period (CFP) protocol, or another protocol that might be of use in future versions of the 802.11 standard.

It should be appreciated that enhanced stations according to various exemplary embodiments of this invention may be sensitive to why a network allocation vector (NAV) is set. If, for example, the enhanced station could differentiate between the network allocation vector (NAV) being set because it was in a contention free period (CFP) or being set by a recently transmitted message frame such as data, request-to-send signal request-to-send (RTS), or clear-to-send signal (CTS), for example, it may chose to ignore the network allocation vector (NAV) only for the contention free period (CFP), and obey the network allocation vector (NAV) if it would interrupt an ongoing 802.11 frame exchange sequence. In this example, the standard practice of transmitting the clear-to-send signal (CTS) after a short inter-face time interval (SIFS) would be used. However, if clear channel assessment were not idle, or the network allocation vector (NAV) was causing suppression due to an ongoing frame exchange sequence, no clear-to-send signal (CTS) response would occur. Thus, according to these various exemplary embodiments of this invention, the station transmitting the request-to-send signal (RTS) would realize that if no clear-to-send signal (CTS) response is heard after a short inter-face time interval (SIFS), the station must be suppressed. At that point, the transmitting station could either retry the request-to-send signal (RTS) or give up until a later time.

It should be appreciated that in accordance with these exemplary embodiments, a PCF inter-face time interval (PIFS) may be used for the retry to maintain access priority on the medium, even outside of the contention free period (CFP), and that the request-to-send (RTS) and clear-to-send (CTS) frames may also be allowed within the contention free period (CFP).

Figure 8:
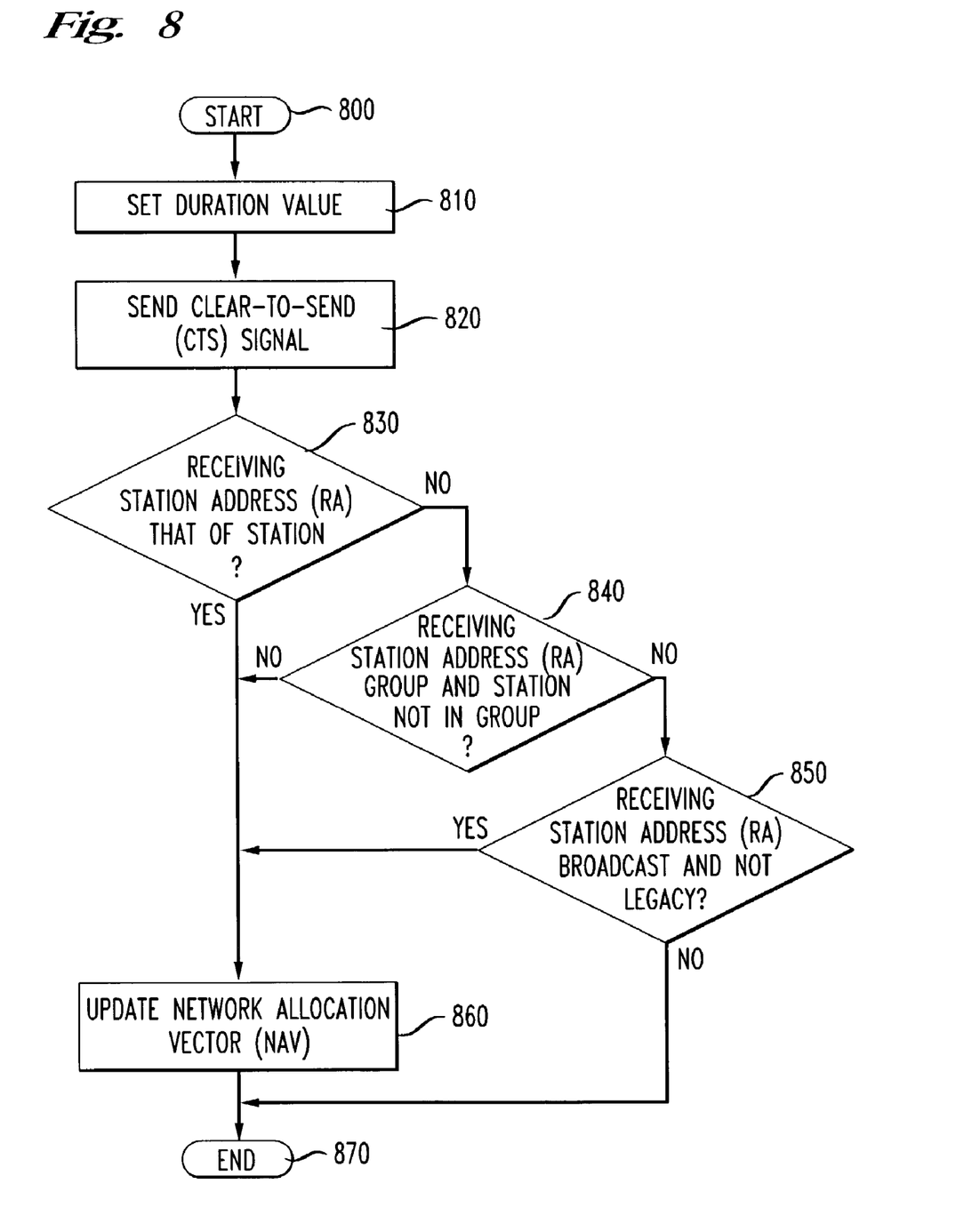
FIG. 8 is a flowchart illustrating an exemplary method of enhancing the signal transmission according to this invention.

FIG. 8 is a flowchart illustrating a method of updating the network allocation vector (NAV) in accordance with an exemplary embodiment of this invention. As shown in FIG. 8, the process begins with step 800, and continues to step 810, where the duration value is set. That is, in this step, the duration value is set to a value other than a time period for subsequent transmission to spoof obeying stations. Control then continues to step 820.

In step 820, a signal, such as the clear-to-send (CTS) signal is sent containing the set duration value. Next, in step 830, a determination is made as to whether the receiving station address (RA) in the signal is that of the station. If the receiving station address (RA) is that of the station, control jumps to step 860, where the network allocation vector (NAV) is updated. If not, the receiving station address (RA) is not that of the station, control continues to step 840.

In step 840, a determination is made as to whether the receiving station address (RA) in the signal is a group address and whether the station is not in the addressed group. If the receiving station address (RA) is a group address and the station is not in the addressed group, control jumps to step 860, where the network allocation vector (NAV) is updated. If not, control continues to step 850.

In step 850, a determination is made as to whether the receiving station address (RA) in the signal is a broadcast address and whether the station is not a legacy station. If the receiving station address (RA) is a broadcast address and the station is not in the addressed group, control continues to step 860, where the network allocation vector (NAV) is updated. If not, control jumps to step 870. In step 870, the process ends.

Figure 9:
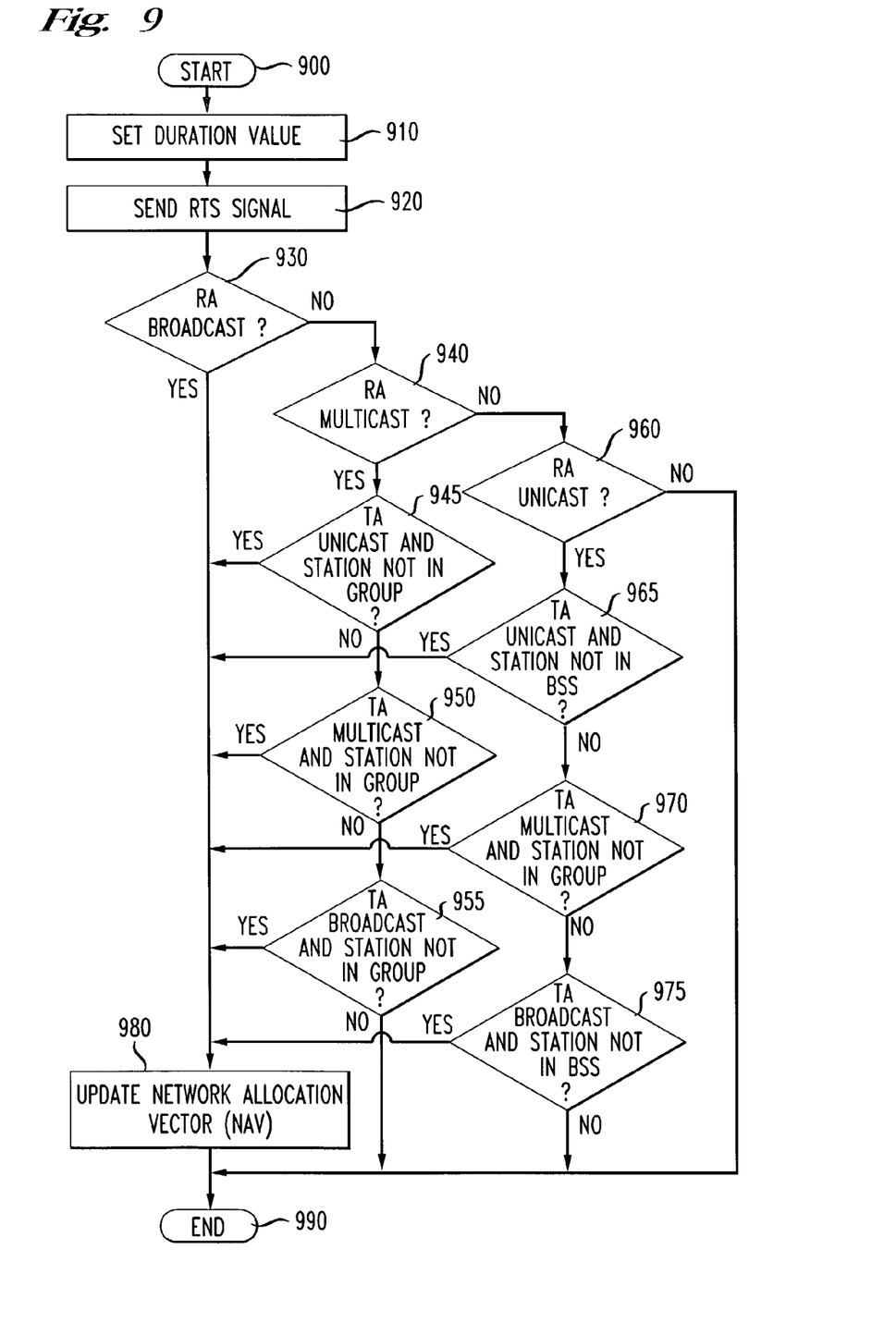
FIG. 9 is a flowchart illustrating another exemplary method of enhancing the signal transmission according to this invention.

FIG. 9 is a flowchart illustrating a method of updating the network allocation vector (NAV) in accordance with another exemplary embodiment of this invention. As shown in FIG. 9, the process begins with step 900, and continues to step 910, where the duration value is set. That is, in this step, the duration value is set to a value other than a time period for subsequent transmission to spoof obeying stations. Control then continues to step 920.

In step 920, a signal, such as the request-to-send (RTS) signal is sent containing the set duration value. Next, in step 930, a determination is made as to whether the receiving station address (RA) in the signal is a broadcast address. If the receiving station address (RA) is a broadcast address, control jumps to step 980, where the network allocation vector (NAV) is updated. If not, the receiving station address is not a broadcast address, control continues to step 940.

In step 940, a determination is made as to whether the receiving station address (RA) in the signal is a multicast address. If the receiving station address (RA) is not a multicast address, control jumps to step 960. If the receiving station address (RA) is a multicast address, control continues to step 945.

In step 945, a determination is made as to whether the transmitting station address (TA) is a unicast address and whether the station is not in the group identified by the multicast address. If the transmitting station address (TA) is a unicast address and the station is not in the group, control jumps to step 980, where the network allocation vector (NAV) is updated. If not, control continues to step 950.

In step 950, a determination is made as to whether the transmitting station address (TA) is a multicast address and whether the station is not in the group identified by the multicast address contained in the transmitting station address (TA). If the transmitting station address (TA) is a multicast address and the station is not in the group identified by the multicast address contained in the transmitting station address (TA), control jumps to step 980, where the network allocation vector (NAV) is updated. If not, control continues to step 955.

In step 955, a determination is made as to whether the transmitting station address (TA) is a broadcast address and whether the station is not in the group identified by the multicast address. If the transmitting station address (TA) is a broadcast address and the station is not in the group, control jumps to step 980, where the network allocation vector (NAV) is updated. If not, control jumps to step 990.

Next, in step 960, a determination is made as to whether the receiving station address (RA) in the signal is a unicast address. If the receiving station address (RA) is not a unicast address, control jumps to step 990. If the receiving station address (RA) is a unicast address, control continues to step 965.

In step 965, a determination is made as to whether the transmitting station address (TA) is the same unicast address as that contained in the receiving station address (RA) and whether the station is not in the basic service set (BSS) identified by the unicast address. If the transmitting station address (TA) is the unicast address and the station is not in the basic service set (BSS), control jumps to step 980, where the network allocation vector (NAV) is updated. If not, control continues to step 970.

In step 970, a determination is made as to whether the transmitting station address (TA) is a multicast address and whether the station is not in the group identified by the multicast address contained in the transmitting station address (TA). If the transmitting station address (TA) is the multicast address and the station is not in the group, control jumps to step 980, where the network allocation vector (NAV) is updated. If not, control continues to step 975.

In step 975, a determination is made as to whether the transmitting station address (TA) is a broadcast address and whether the station is not in the basic service set (BSS) identified by the unicast address. If the transmitting station address (TA) is a broadcast address and the station is not in the basic service set (BSS), control continues to step 980, where the network allocation vector (NAV) is updated. If not, control jumps to step 990. In step 990, the process ends.

Figure 10:
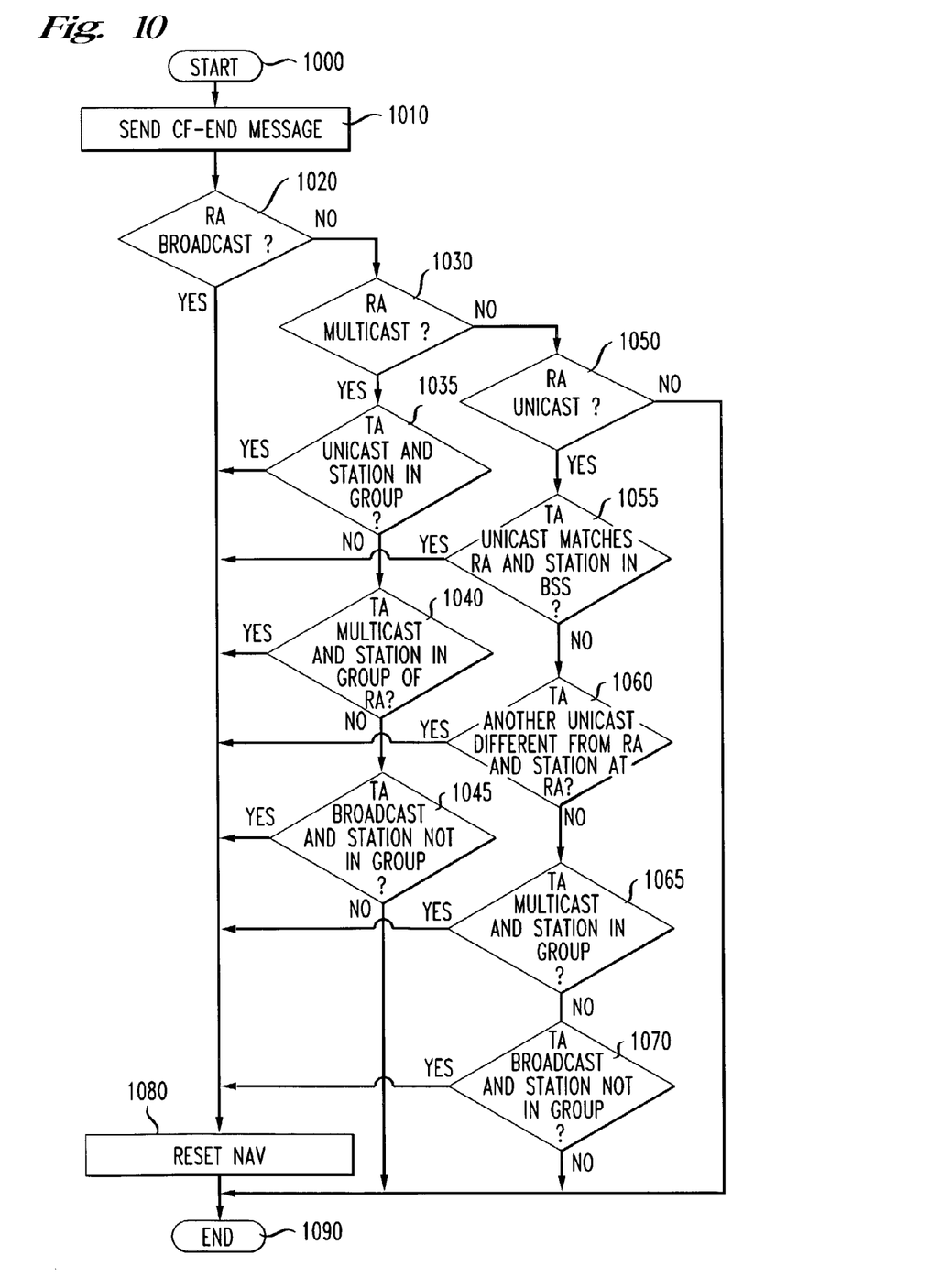
FIG. 10 is a flowchart illustrating another exemplary method of enhancing the signal transmission according to this invention.

FIG. 10 is a flowchart illustrating a method of resetting the network allocation vector (NAV) in accordance with another exemplary embodiment of this invention. As shown in FIG. 10, the process begins with step 1000, and continues to step 1010, where the CF-End message is sent. In this step, the CF-End indicates a value other than the end of the contention free period to spoof obeying stations. Next, in step 1020, a determination is made as to whether the receiving station address (RA) in the message is a broadcast address. If the receiving station address (RA) is a broadcast address, control jumps to step 1080, where the network allocation vector (NAV) is reset. If not, the receiving station address (RA) is not a broadcast address, control continues to step 1030.

In step 1030, a determination is made as to whether the receiving station address (RA) in the signal is a multicast address. If the receiving station address (RA) is not a multicast address, control jumps to step 1050. If the receiving station address (RA) is a multicast address, control continues to step 1035.

In step 1035, a determination is made as to whether the transmitting station address (TA) is a unicast address and whether the station is in the group addressed by the receiving station address (RA). If the transmitting station address (TA) is a unicast address and the station is in the group, control jumps to step 1080, where the network allocation vector (NAV) is reset. If not, control continues to step 1040.

In step 1040, a determination is made as to whether the transmitting station address (TA) is a multicast address and whether the station is in the group addressed by the receiving station address (RA). If the transmitting station address (TA) is a multicast address and the station is in the group addressed by the receiving station address (RA), control jumps to step 1080, where the network allocation vector (NAV) is reset. If not, control continues to step 1045.

In step 1045, a determination is made as to whether the transmitting station address (TA) is a broadcast address and whether the station is not in the group addressed by the receiving station address (RA). If the transmitting station address (TA) is a broadcast address and the station is not in the group addressed by the receiving station address (RA), control jumps to step 1080, where the network allocation vector (NAV) is reset. If not, control jumps to step 1090.

Next, in step 1050, a determination is made as to whether the receiving station address (RA) in the signal is a unicast address. If the receiving station address (RA) is not a unicast address, control jumps to step 1090. If the receiving station address (RA) is a unicast address, control continues to step 1055.

In step 1055, a determination is made as to whether the transmitting station address (TA) is a unicast address, whether the transmitting station address (TA) matches the receiving station address (RA), and whether the station is in the same basic service set (BSS). If the transmitting station address (TA) is a unicast address, matches the receiving station address (RA), and the station is in the same basic service set (BSS), control jumps to step 1080, where the network allocation vector (NAV) is reset. If not, control continues to step 1060.

In step 1060, a determination is made as to whether the transmitting station address (TA) is another unicast address and the station is at the receiving station address (RA). If the transmitting station address (TA) is another unicast address and the station is at the receiving station address (TA), control jumps to step 1080, where the network allocation vector (NAV) is reset. If not, control continues to step 1065.

In step 1065, a determination is made as to whether the transmitting station address (TA) is a multicast address and whether the station is in the group addressed by the multicast address. If the transmitting station address (TA) is a multicast address and the station is in the group, control jumps to step 1080, where the network allocation vector (NAV) is reset. If not, control continues to step 1070.

In step 1070, a determination is made as to whether the transmitting station address (TA) is a broadcast address and whether the station is in the same basic service set (BSS) as the unicast address. If the transmitting station address (TA) is a broadcast address and the station is in the same basic service set (BSS) as the unicast address, control continues to step 1080, where the network allocation vector (NAV) is reset. If not, control jumps to step 1090. In step 1090, the process ends.

Figure 11:
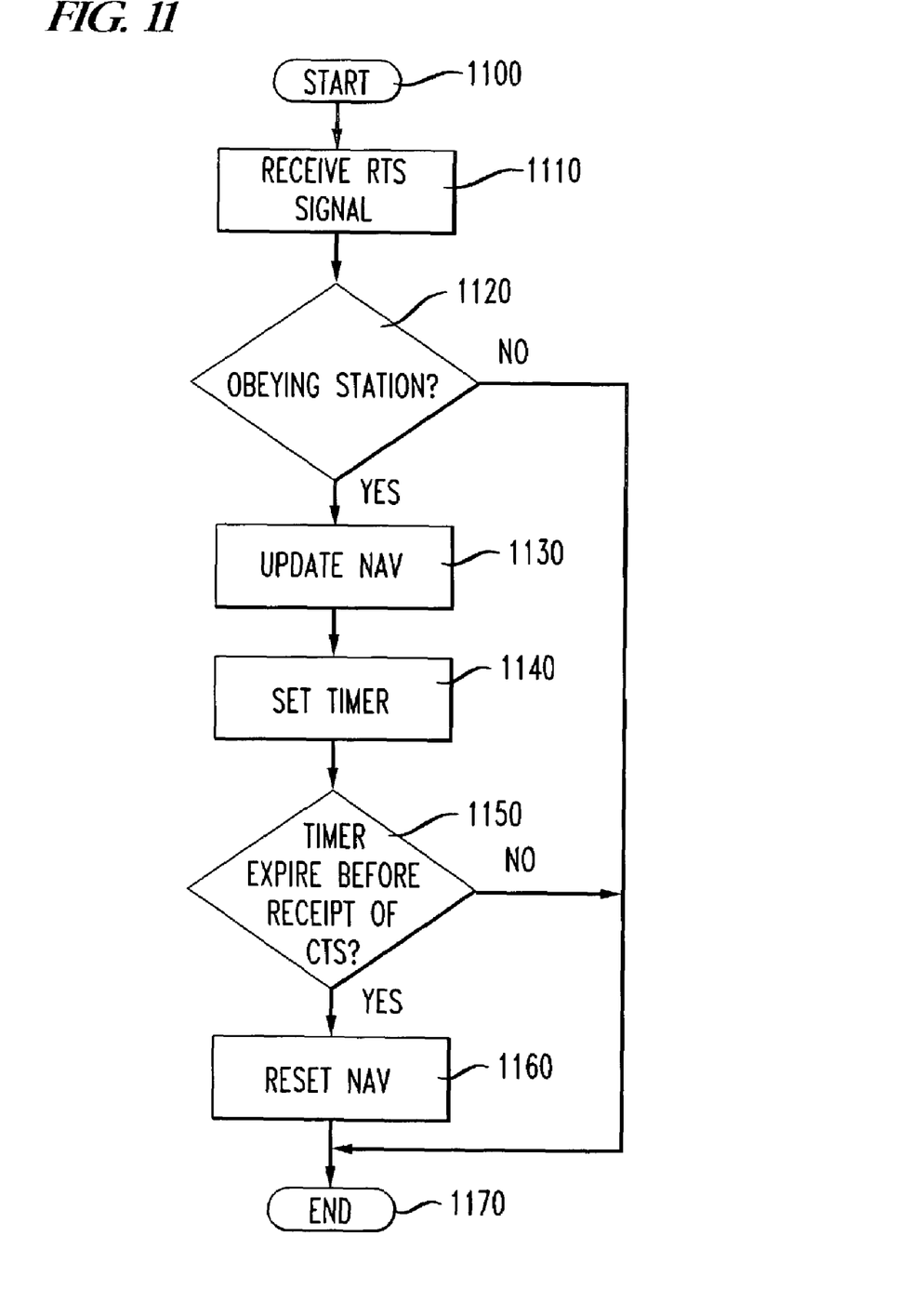
FIG. 11 is a flowchart illustrating another exemplary method of enhancing the signal transmission according to this invention

FIG. 11 is a flowchart illustrating a method of updating the network allocation vector (NAV) in accordance with another exemplary embodiment of this invention. As shown in FIG. 11, the process begins with step 1100, and continues to step 1110, where the duration value is set. That is, in this step, the duration value is set to a value other than a time period for subsequent transmission to spoof obeying stations. Control then continues to step 1120.

In step 1120, the address is determined from an address already in use for another standard. Then, in step 1130, a signal containing the set duration value is sent to the borrowed address. That is, though the transmissions are in the 802.11 standard, an address in another standard already in use for a similar purpose to the 802.11 standard, such as the 802.3 standard, may be used. For example, the PAUSE address given as 01-80-C2-00-00-01 in Hexadecimal notation may be borrowed from the 802.3 standard to the 802.11 standard. By reusing the multicast address from another standard such as the 802.3 standard in an 802.11 transmission, advantages such as saving address space may be obtained. Control then continues to step 1140.

In step 1140, a station within the range of the signal determines whether or not it recognizes the address as a borrowed address. If not, the station is, for example, a legacy station which automatically assumes that it is addressed by the borrowed address, control continues to step 1150 where the station's network allocation vector (NAV) is updated. That is, stations not practicing the enhanced 802.11e standard will be spoofed into automatically setting the network allocation vector (NAV) in accordance with the duration value, and will not transmit.

On the other hand, if the station is practicing the enhanced 802.11e standard, and recognizes that the address is a borrowed address, control jumps to step 1160, where the station will check as to make sure it is not in the addressed group, and will not set its network allocation vector (NAV). Control then continues to step 1170, the process ends.

It should be appreciated that many other possibilities exist. That is, it should be appreciated that the exemplary embodiments discussed above are just a small list of examples of how the principles of the present invention can be applied. Other arrangements and methods can be implemented by those skilled in the art without departing from the spirit and scope of the present invention.

What is claimed is:

1. A method for spoofing stations while transmitting data through a medium using a first standard, the method comprising:

setting a duration value to a value other than a time period for a predetermined subsequent message transmission; and sending a signal containing the duration value to an address already in use by a second standard, wherein at least one of the stations is an obeying station that updates network allocation vector.

2. The method of claim 1, wherein the first standard is an 802.11 standard.

3. The method of claim 2, wherein the second standard is an 802.3 standard and the address is used for suppressing transmission in the 802.3 standard.

4. The method of claim 3, wherein the address is a PAUSE address in the 802.3 standard, and the address is given as 01-80-C2-00-00-01 in Hexadecimal notation.

5. The method of claim 1, wherein the duration value represents a time period for suppressing transmissions by the obeying station.

6. The method of claim 5, wherein transmissions of unknown protocols are given preferential use of the medium when the transmissions by the obeying station are suppressed.

7. The method of claim 5, wherein transmissions of hidden stations are given preferential use of the medium when the transmissions by the obeying station are suppressed.

8. The method of claim 5, wherein critical transmissions are given preferential use of the medium when the transmissions by the obeying station are suppressed.

9. The method of claim 5, wherein at least some of the stations are provided in an overlapping basic service set, and stations of the overlapping basic service set are given preferential use of the medium when the transmissions by the obeying station are suppressed.

10. The method of claim 5, wherein stations of an enhanced version of a standard are given preferential use of the medium when the transmissions by the obeying station are suppressed.

11. The method of claim 1 where the set duration value is long enough to cover a time remaining to a next target beacon transmit time.

12. A machine-readable medium having stored thereon a plurality of executable instructions, the plurality of instructions comprising instructions to:

set a duration value to a value other than a time period for a predetermined subsequent message transmission; and send a signal containing the duration value to an address already in use by a second standard, wherein at least one of the stations operating in accordance with a first standard, is an obeying station that updates a network allocation vector in accordance with the duration value.

13. The machine-readable medium of claim 12, wherein the first standard is an 802.11 standard.

14. The machine-readable medium of claim 13, wherein the second standard is an 802.3 standard.

15. The machine-readable medium of claim 12, wherein the address is a PAUSE address in the 802.3 standard, and the address is given as 01-80-C2-00-00-01 in Hexadecimal notation.

16. The machine-readable medium of claim 12, wherein the duration value represents a time period for suppressing transmissions by the obeying station.

17. A method for spoofing stations while transmitting data through a medium using a first standard, the method comprising:

a station, operating in accord with solely said first standard setting a duration interval value to a value other than a time period that is needed for transmission of a data message followed by a reception of an acknowledgement message; and said station sending a signal containing the duration value to an address having characteristics of a second standard that is different from said first standard, wherein at least some of the stations are obeying stations that update their respective network allocation vectors in response to the duration value to allow stations other than said obeying stations to intercommunicate during said duration interval.

18. A machine-readable medium having stored thereon a plurality of executable instructions, the plurality of instructions comprising instructions to:

set a duration interval value to a value other than a time period that is needed for transmission of a data message followed by a reception of an acknowledgement message; and send a signal containing the duration value to an address recognizable by stations as belonging to a second standard that is different from said first standard, wherein at least one of the stations is an obeying station that updates a network allocation vector in response to said signal having an address in accord with said second standard.

* * * * *